United States Patent [19]

Hamada et al.

[11] Patent Number: 4,898,689

[45] Date of Patent: Feb. 6, 1990

[54] ELECTROCONDUCTIVE SILICONE RUBBER PARTICLES

[75] Inventors: Mitsuo Hamada, Kisarazu; Koji Shimizu, Ichihara; Haruki Wakita, Chiba, all of Japan

[73] Assignee: Toray Silicone Company, Ltd., Tokyo, Japan

[21] Appl. No.: 213,394

[22] Filed: Jun. 30, 1988

[51] Int. Cl.[4] .............................................. H01B 1/06
[52] U.S. Cl. ..................................... 252/510; 252/511; 252/512; 524/495; 524/496; 524/439; 428/407; 428/402
[58] Field of Search ............... 252/511, 510, 502, 512; 524/495, 496, 439, 588; 428/404, 405, 407, 402

[56] References Cited

U.S. PATENT DOCUMENTS 4,273,697  6/1981  Sumimura et al. ................. 252/511

Primary Examiner—Josephine Barr
Attorney, Agent, or Firm—Edward C. Elliott

[57] ABSTRACT

The electroconductive silicon rubber particulate of the present invention is an electroconductive silicone rubber particulate characterized by the fact that it contains an electroconductive material and that the particle diameter is from 0.1 to 1000 micrometers. It is an electroconductive material having excellent properties of lubrication, and has the characteristic capability, when added to a variety of materials such as various organic resins and rubbers including silicone rubber, of contributing to these materials stable levels of conductivity ranging from the semiconductive range to the conductive range, for the prevention of electrostatic and electrical charge build-up.

8 Claims, No Drawings

ELECTROCONDUCTIVE SILICONE RUBBER PARTICLES

BACKGROUND OF THE INVENTION

1. Field of the Invention

The present invention concerns an electroconductive silicone rubber particulate which is well-suited to use as an electroconductive additive or anti-charge agent for a variety of materials including various types of rubber and organic resins.

2. Background Information

Silicone rubber particulates and their methods of manufacture are known in the art (see Laid-open Patent No. 59-68,333, which teaches the formation of silicone rubber particles by curing by heat or irradiation in a spray drier). However, electroconductive silicone rubber particulates, and in particular electroconductive silicone rubber particulates well-suited to use as electroconductive additives and anti-charge agents have been unknown to date. The fact that an object molded of silicone rubber would show electrical conductivity when an electroconductive material such as carbon black had been added to and mixed into the silicone rubber composition from which the object was formed is known in the art (see Japanese Laid-open Patent No. 57-91,250, which teaches a conductive silicone rubber composition containing furnace black, with acetylene black as an optional ingredient which is foamed and cured to give an electrically conductive sponge). An electrically conductive curable liquid organopolysiloxane composition which contains a specific carbon black is taught in U.S. Pat. No. 4,273,697, issued June 16, 1981. The addition of chopped graphite fibers into an electrically conductive silicone elasomeric mixture is taught in U.S. Pat. No. 4,279,783, issued July 21, 1981. A cured unitary molded article containing conductive and insulating silicone rubber components is taught in U.S. Pat. No. 4,505,848, issued Mar. 19, 1985.

Electroconductive materials such as carbon black, when added to and mixed into a silicone rubber composition, have not always provided uniform conductivity throughout the entire silicone rubber molded product. It has also been difficult to control the level of conductivity, and particularly with regard to anti-charge and anti-electrostatic properties in semiconductive areas, it has been difficult to provide semiconductivity within the target range. The inventors of the present invention carried out extensive investigations leading to results which culminated in the present invention.

SUMMARY OF THE INVENTION

An electroconductive silicone rubber particulate is formed by mixing a curable silicone rubber and electrically conductive material, then reducing the mixture to particles of from 0.1 to 1000 micrometers diameter and curing. These electroconductive silicone rubber particulates are then used as an electroconductive additive in various types of rubber and organic resins, to yield an electroconductive material having improved conductivity.

The objective of the present invention is to provide an electroconductive silicone rubber particulate, and in particular, an electroconductive silicone rubber particulate which is well-suited for use as an additive providing electrical conductivity or an anti-charge agent for a variety of materials including various rubbers and organic resins.

DESCRIPTION OF THE INVENTION

The present invention is an electroconductive silicone rubber particulate characterized by the fact that it contains an electrically conductive material and has a particle diameter of from 0.1 to 1,000 micrometers.

To explain, there are no particular limits on the conductive material used in the present invention as long as said material provides the silicone rubber particulate with properties of electrical conductivity or anti-charge properties. Examples of conductive materials include carbon black such as furnace black, lamp black, thermal black, acetylene black and channel black, metal powders, carbon fiber powders, and graphite powders. Of these, carbon black is preferable because it has the best properties of lubrication, is highly effective in contributing electroconductive properties, and is easy to handle. The content of electroconductive material should be in a range of from 0.5 to 280 parts by weight to 100 parts by weight of the silicone rubber, with a range of from 1 to 100 parts by weight preferred for the electroconductive material.

Under the present invention, it is necessary that an electroconductive material be included and that the particle diameter be from 0.1 to 1000 micrometers. If the particle diameter falls below 0.1 micrometer, then when the substance is used to provide electroconductive properties in silicone rubber it will be impossible to achieve uniform conductivity and/or semiconductivity in the resulting silicone rubber formed product. If the particles exceed 1000 micrometers in diameter, then there will be a loss of dispersion properties of the electroconductive silicone rubber particulate as the electroconductive additive or anti-charge agent which is added to a variety of rubbers, organic resins, and lubricants to make them electrically conductive.

Conventional silicone rubbers as known in the art can be used for the silicone rubber which forms the silicone rubber particulate of the present invention. Possibilities include, for example, organic-peroxide-hardenable silicone rubber whereby a diorganopolysiloxane containing vinyl groups is hardened by an organic peroxide, addition-reaction-hardenable silicone rubber whereby a diorganopolysiloxane containing silicon-atom-bonded vinyl groups and an organopolysiloxane having silicon-atom-bonded hydrogen atoms undergo an addition reaction and hardening in the presence of a platinum-type compound, condensation-reaction-hardenable silicone rubber whereby a diorganopolysiloxane having terminal hydroxyl groups on both ends of the molecular chain and an organopolysiloxane containing silicon-atom-bonded hydrogen atoms undergo a condensation reaction and hardening in the presence of an organotin compound, and condensation-reaction-hardenable silicone rubber whereby a diorganopolysiloxane having terminal hydroxyl groups on both ends of the molecular chain and a hydrolytic organosilane undergoes a condensation reaction in the presence of an organotin compound or a titanic acid ester. For the purposes of the present invention, the latter two groups (addition-reaction-hardenable silicone rubber and condensation-reaction-hardenable silicone rubber) are preferable because of ease of production and handling.

Methods of manufacturing the electroconductive silicone rubber particulate of the present invention include methods such as, for example, the following. A method whereby an electroconductive silicone rubber particulate is obtained by adding and admixing an electroconductive material to a liquid addition-reaction-hardenable silicone rubber composition, forming an electroconductive liquid silicon rubber composition, after which said composition is sprayed into air heated to 80° to 200° C., and the composition hardens in spray form, the particles being within the required diameter range. Or, a method whereby an electroconductive silicone rubber particulate is obtained by adding and admixing an electroconductive material into a liquid condensation-reaction-hardenable silicone rubber composition or addition-reaction-hardenable silicone rubber composition, distributing said composition through water or water containing a surfactant, forming a dispersed liquid in which said composition forms a discontinuous phase within the water; after which said dispersed liquid is left to stand in heated air, or is sprayed into heated air, so that the hardening of the dispersed silicone rubber composition is completed at the same time the water content is removed, resulting in the electroconductive particulates.

Electroconductive silicone rubber particulates as discussed above are electroconductive materials with excellent properties of lubrication. They are well-suited for applications as electroconductive additives or anti-charge agents for such materials as a variety of rubbers including silicone rubber, a variety of organic resins, and a variety of lubricants. In particular, they are well-suited as electroconductive additives or anti-charge agents for use in silicone rubbers.

The electroconductive silicone rubber particulates are dispersed in a matrix to provide electrical conductivity to the combination. The matrix can be a variety of materials such as are discussed above. The electroconductive silicone rubber particulates can be dispersed throughout the matrix by any suitable mixing means appropriate to the viscosity of the matrix material. When the matrix is a rubber, such as silicone rubber, a 3 roll mill is a particularly appropriate mixing means. The particulates can be used to impart electrical conductivity to matrix materials which are used in a solid, cured state, such as a rubber; or can be used in a liquid, uncured material, such as a lubricant. The use of the electroconductive silicone rubber particulates of this invention allows a composition to be prepared which has an improved electrical conductivity when compared to a similar composition in which the electrically conductive material is added as an ingredient rather than as part of the electroconductive silicone rubber particulate.

The invention will be explained with reference to examples which are included for illustrative purposes only and should not be construed as limiting the invention which is properly set forth in the appended claims. In the examples, "parts" refers to "parts by weight," and "percent" refers to "weight percent."

EXAMPLE 1

To 100 parts of polydimethylsiloxane with terminal hydroxyl groups at both ends of the molecular chain (hydroxyl group content 1.3%) and having a viscosity of 100 centipoise was added 20 parts of Denka Black (electrically conductive carbon black manufactured by Denki Kagaku KK) having a surface area of 70 $m^2/g$, and 12 parts polymethylhydrogensiloxane with terminal trimethylsiloxy groups at both ends of the molecular chain (silicon-atom-bonded hydrogen atom content 1.5%). The combination was mixed until uniform (Mixture A).

Next, 100 parts of polydimethylsiloxane identical to that used above was combined with 20 parts Denka Black identical to that used above. These substances were mixed, then 1.5 parts tin catalyst (stannic octoate) was added, and the combination was mixed using a 3 roll mill. (Mixture B).

These mixtures A and B were weighed to provide a 1:1 weight ratio, and then were sent by means of a gear pump to a static mixer (10-element, manufactured by Tokushu Kika KK) and were mixed until uniform (Mixture C). This mixture was send to a colloid mill (manufactured by Manton Gori Co., while simultaneously 1200 parts of ion exchange water and 5 parts of surfactant (methylene oxide addition product of trimethylnonanol, a non-ionic surfactant manufactured by Union Carbide Corporation) were added. The combination was milled at 1400 rpm under a gap of 0.1 mm. The result was an aqueous dispersion of an electroconductive silicone rubber composition.

This aqueous dispersion of an electroconductive silicone rubber composition was left to stand at room temperature for 3 hours, after which it was sprayed into a spray dryer (manufactured by Ashizawa, Niro, Atomaiza KK) having a temperature of 300° C. at the intake and 110° C. at the outlet. Here hardening was completed, yielding a spherical rubber powder. When placed between glass slides and observed under a microscope, the spherical diameter of these rubber particles was observed to increase, confirming the elasticity of the rubber. When these glass slides were rubbed together, they showed excellent properties of lubrication. Observed under a scanning electron microscope, these spherical rubber particles showed an average diameter of 20 micrometers.

Next, 100 parts of polydimethylsiloxane gum with terminal dimethylvinylsiloxy groups on both ends of the molecular chain and 20 parts of fumed silica were mixed uniformly to make a silicone rubber stock.

Following this, quantities as shown in Table 1 of the electroconductive silicone rubber particulate obtained as described above were added to and mixed into 100 parts of this silicone rubber stock. Simultaneously 0.5 parts of di-t-butyl peroxide was added, and the entire combination was mixed until uniform. These mixtures were molded into sheets by press curing at 170° C. to form silicone rubber sheets of 2 millimeters thichness. These silicone rubber sheets were not sticky, and the surfaces were extremely smooth.

Next, individual volumetric resistance rates were measured at 50 locations on these silicone rubber sheets. Those measured values and the range of statistical deviation are shown in Table 2.

TABLE 1

| Composition | Example Number | | | | | | | |
|---|---|---|---|---|---|---|---|---|
| | 1 | 2 | 3 | 4 | 5 | 6 | 7 | 8 |
| Electroconductive silicone rubber particulate Parts | 25 | 30 | 50 | 60 | 75 | 85 | 100 | 125 |
| Carbon black in total composition Weight percent | 3.3 | 3.8 | 5.5 | 6.2 | 7.1 | 7.6 | 8.3 | 9.2 |

TABLE 2

| Item | Practical Example Number | | | | | | | |
|---|---|---|---|---|---|---|---|---|
| | 1 | 2 | 3 | 4 | 5 | 6 | 7 | 8 |
| Individual volumetric resistance rate ohm-cm | $4 \times 10^{11}$ | $5 \times 10^{11}$ | $4 \times 10^{11}$ | $3 \times 10^{11}$ | $1 \times 10^{10}$ | $3 \times 10^9$ | $3 \times 10^3$ | $1 \times 10^3$ |
| Range of statistical deviation of individual volumetric resistance rate | $3 \times 10^{11}$ $5 \times 10^{11}$ | $4 \times 10^{11}$ $5 \times 10^{11}$ | $3 \times 10^{11}$ $5 \times 10^{11}$ | $2 \times 10^{11}$ $4 \times 10^{11}$ | $1 \times 10^{10}$ $4 \times 10^{10}$ | $2 \times 10^9$ $6 \times 10^9$ | $2 \times 10^3$ $4 \times 10^5$ | $1 \times 10^3$ $2 \times 10^5$ |

EXAMPLE 2

To 100 parts of polydimethylsiloxane with terminal dimethylvinylsiloxy groups at both ends of the molecular chain (vinyl group content 0.5%) and having a viscosity of 500 centipoise was added 20 parts of Denka Black (electrically conductive carbon black manufactured by Denki Kagaku Kogyo KK) having a surface area of 70 m²/g. After the combination was mixed, 6 parts of polymethylhydrogensiloxane with terminal trimethyl siloxy groups on both ends of the molecular chain (silicon-atom-bonded hydrogen atom content 1.5%) and having a viscosity of 10 centipoise was added, and this combination was mixed with a 3 roll mill (Mixture A).

Next, 100 parts of polydimethylsiloxane identical to that used above and 20 parts of Denka Black identical to that used above were combined and mixed, after which 0.6 parts of chloroplatinic acid in isopropyl alcohol solution (platinum content 3%) was added. This combination was mixed using a 3 roll mill (Mixture B). These mixtures, A and B, were mixed in a colloid mill just as was done in Example 1, to yield an electroconductive silicone rubber particulate, just as in Example 1. The resulting electroconductive silicone rubber had an average particle diameter of 70 micrometers, and the surfaces showed excellent properties of lubrication. Next, this electroconductive silicone rubber particulate was distributed in the quantities indicated in Table 3, into samples of silicone rubber stock as in Example 1. Subsequent procedures were in accordance with Example 1, resulting in the formation of silicone rubber sheets. The surface of the resulting silicone rubber sheets was not sticky, and extremely smooth. Individual volumetric resistance rates were measured for these silicone rubber sheets as was done in Example 1. Those measured values and the range of statistical deviation are shown in Table 4.

TABLE 3

| Composition | Example Number | | | | | | |
|---|---|---|---|---|---|---|---|
| | 9 | 10 | 11 | 12 | 13 | 14 | 15 |
| Electroconductive silicone rubber particulate Parts | 25 | 30 | 50 | 60 | 75 | 100 | 125 |
| Carbon black in total composition Weight percent | 3.3 | 4.3 | 5.6 | 6.3 | 7.2 | 8.4 | 9.3 |

TABLE 4

| Item | Example Number | | | | | | |
|---|---|---|---|---|---|---|---|
| | 9 | 10 | 11 | 12 | 13 | 14 | 15 |
| Individual volumetric resistance rate ohm-cm | $1 \times 10^{12}$ | $9 \times 10^{11}$ | $6 \times 10^{11}$ | $3 \times 10^{11}$ | $3 \times 10^9$ | $2 \times 10^3$ | $1 \times 10^3$ |
| Range of statistical deviation of individual volumetric resistance rate | $1 \times 10^{12}$ to $2 \times 10^{12}$ | $8 \times 10^{11}$ to $10 \times 10^{11}$ | $5 \times 10^{11}$ to $7 \times 10^{11}$ | $2 \times 10^{11}$ to $4 \times 10^{11}$ | $1 \times 10^9$ to $5 \times 10^9$ | $1 \times 10^3$ to $2 \times 10^3$ | $1 \times 10^3$ to $2 \times 10^3$ |

COMPARATIVE EXAMPLE 1

For purposes of comparison, DenkaBlack (electroconductive carbon black) as used in Example 1 was added to samples of the silicone rubber stock used in Example 1, in the same quantities as used in Table 1 of Example 1, and mixing was carried out under the same conditions as for Example 1. This resulted in the production of the electroconductive silicone rubber compositions shown in Table 5. These electroconductive silicone rubber compositions were heated under the same conditions as for Example 1, and silicone rubber formed products were obtained. Individual volumetric resistance rates and the range of statistical deviation were determined for these sheets under the same conditions as for Example 1. Results are shown in Table 6.

A comparison of the results shown in Table 6 with those of Tables 2 and 4 shows that the use of the electroconductive silicone rubber particulates of this invention results in a much higher electrical conductivity than is obtained when the same amount of carbon black is used to make a conductive rubber which does not make use of the particulates.

TABLE 5

| Composition | Example Number | | | | | | |
|---|---|---|---|---|---|---|---|
| | 16 | 17 | 18 | 19 | 20 | 21 | 22 |
| Carbon black in total composition Weight percent | 3.3 | 3.8 | 5.5 | 6.3 | 7.2 | 8.4 | 9.3 |

TABLE 6

| Item | Example Number | | | | | | |
|---|---|---|---|---|---|---|---|
| | 16 | 17 | 18 | 19 | 20 | 21 | 22 |
| Individual volumetric resistance rate ohm-cm | $1 \times 10^{15}$ | $3 \times 10^{15}$ | $9 \times 10^{14}$ | $5 \times 10^{14}$ | $8 \times 10^{13}$ | $5 \times 10^{11}$ | $1 \times 10^5$ |
| Range of statistical deviation of individual volumetric resistance rate | $1 \times 10^{15}$ to $3 \times 10^{15}$ | $1 \times 10^{15}$ to $5 \times 10^{15}$ | $5 \times 10^{14}$ to $1 \times 10^{15}$ | $1 \times 10^{14}$ to $9 \times 10^{14}$ | $4 \times 10^{13}$ to $1 \times 10^{14}$ | $1 \times 10^{11}$ to $1 \times 10^{12}$ | $1 \times 10^5$ to $5 \times 10^5$ |

That which is claimed is:

1. An electroconductive silicone rubber particulate consisting essentially of from 0.5 to 280 parts by weight of an electrically conductive material per 100 parts by weight of silicone rubber and having a particle diameter of from 0.1 to 1000 micrometers.

2. An electroconductive silicone rubber particulate in accordance with claim 1, wherein the electrically conductive material is carbon black.

3. An electroconductive silicone rubber particulate in accordance with claim 1, characterized by the fact that it serves as an agent for the addition of electroconductive properties to silicone rubber.

4. A composition comprising 100 parts by weight of a matrix, selected from the group consisting of rubber, organic resin, and lubricant, in which from 25 to 125 parts by weight of the electroconductive silicone rubber particulate of claim 1 is uniformly dispersed.

5. The composition of claim 4 in which the matrix is silicone rubber in which the electroconductive silicone rubber particulate of claim 1 is uniformly dispersed.

6. A composition comprising 100 parts by weight of a matrix of silicone rubber in which there is dispsersed from 25 to 125 parts by weight of an electroconductive silicone rubber particulate consisting essentially of from 0.5 to 280 parts by weight of an electrically conductive material per 100 parts by weight of the silicone rubber in the particle and has a particle diameter of from 0.1 to 1000 micrometers.

7. The composition of claim 6 wherein the electrically conductive material is carbon black.

8. The particulate of claim 1 in which the electrically conductive material is present in an amount of from 1 to 100 parts by weight per 100 parts by weight of the silicone rubber in the particle.

* * * * *